US010728438B1

(12) United States Patent
Smith et al.

(10) Patent No.: US 10,728,438 B1
(45) Date of Patent: Jul. 28, 2020

(54) DISTRIBUTED VIDEO AND NETWORK CAMERA MANAGEMENT

(71) Applicant: Amazon Technologies, Inc., Seattle, WA (US)

(72) Inventors: Justin W. Smith, Ashburn, VA (US); Darren Lavey, Washington, DC (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/994,812

(22) Filed: May 31, 2018

(51) Int. Cl.
*H04N 5/232* (2006.01)
*H04N 7/18* (2006.01)
*H04N 5/247* (2006.01)
*H04L 29/08* (2006.01)

(52) U.S. Cl.
CPC ......... *H04N 5/23206* (2013.01); *H04L 67/12* (2013.01); *H04N 5/247* (2013.01); *H04N 7/181* (2013.01)

(58) Field of Classification Search
CPC .......... H04N 7/181; H04N 7/183; H04N 7/18; H04N 7/188; H04N 5/23206; H04N 5/232; H04N 5/77; H04N 5/247; G08B 13/19656; G08B 13/19654; G08B 13/1966; G08B 13/196; H04L 67/12
See application file for complete search history.

(56) References Cited

U.S. PATENT DOCUMENTS

| | | | | |
|---|---|---|---|---|
| 5,784,099 A | * | 7/1998 | Lippincott | H04N 5/232 348/222.1 |
| 8,594,182 B1 | * | 11/2013 | Pardue | H04N 5/77 375/240.01 |
| 9,769,368 B1 | * | 9/2017 | Morford | H04N 5/23206 |
| 2009/0031381 A1 | * | 1/2009 | Cohen | H04L 67/2842 725/115 |
| 2009/0132693 A1 | * | 5/2009 | Pelley | G06Q 10/063 709/223 |
| 2012/0243730 A1 | * | 9/2012 | Outtagarts | G06K 9/00771 382/103 |
| 2015/0138365 A1 | * | 5/2015 | Hsieh | H04N 5/76 348/159 |
| 2016/0014320 A1 | * | 1/2016 | Feltham | H04N 5/23206 348/207.1 |
| 2017/0006313 A1 | * | 1/2017 | Martin | H04N 21/2181 |
| 2017/0280102 A1 | * | 9/2017 | Burke | G06F 16/9537 |
| 2017/0289601 A1 | * | 10/2017 | Ganster | H04N 21/2743 |
| 2018/0063448 A1 | * | 3/2018 | Koiso | H04N 5/77 |
| 2018/0191988 A1 | * | 7/2018 | Takahashi | G06T 11/206 |
| 2018/0197217 A1 | * | 7/2018 | Lin | G06Q 30/0611 |
| 2019/0045119 A1 | * | 2/2019 | Stokking | G06K 9/00758 |

* cited by examiner

*Primary Examiner* — Albert H Cutler
(74) *Attorney, Agent, or Firm* — Thomas | Horstemeyer, LLP

(57) ABSTRACT

Disclosed are various embodiments for distributed video and network camera management. A video management system is described that determines the capabilities of a network camera as it is added or on-boarded to a network. Depending on the capabilities of the network camera, the network camera may be assigned to one of a network video collector or a remote storage service for storing video data generated by the network camera.

20 Claims, 7 Drawing Sheets

DISTRIBUTED VIDEO AND NETWORK CAMERA MANAGEMENT

BACKGROUND

A network camera, also commonly referred to as an internet protocol (IP) camera, is a type of digital video camera capable of sending and receiving data over a computer network, such as the Internet. Network cameras are generally used for conducting webcasts, live streaming of events, monitoring areas, conducting surveillance, and similar functions. Network cameras often interact with network video recorders (NVRs), which are specialized computing systems having video recording and video management software executing thereon. NVRs are commonly used to record video captured using a network camera.

NVRs and their supporting infrastructure are costly to maintain. For instance, as more network cameras are added to a network, more NVRs are required to store video recorded and sent from the network cameras. This requires increased bandwidth capabilities, additional server storage, and other computing resources. As such, the use of NVRs does not scale efficiently as more devices are added to the network. Moreover, NVRs are "centralized" such that a single point of failure (e.g., a failure in a data center) can be catastrophic to the uptime of the network.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
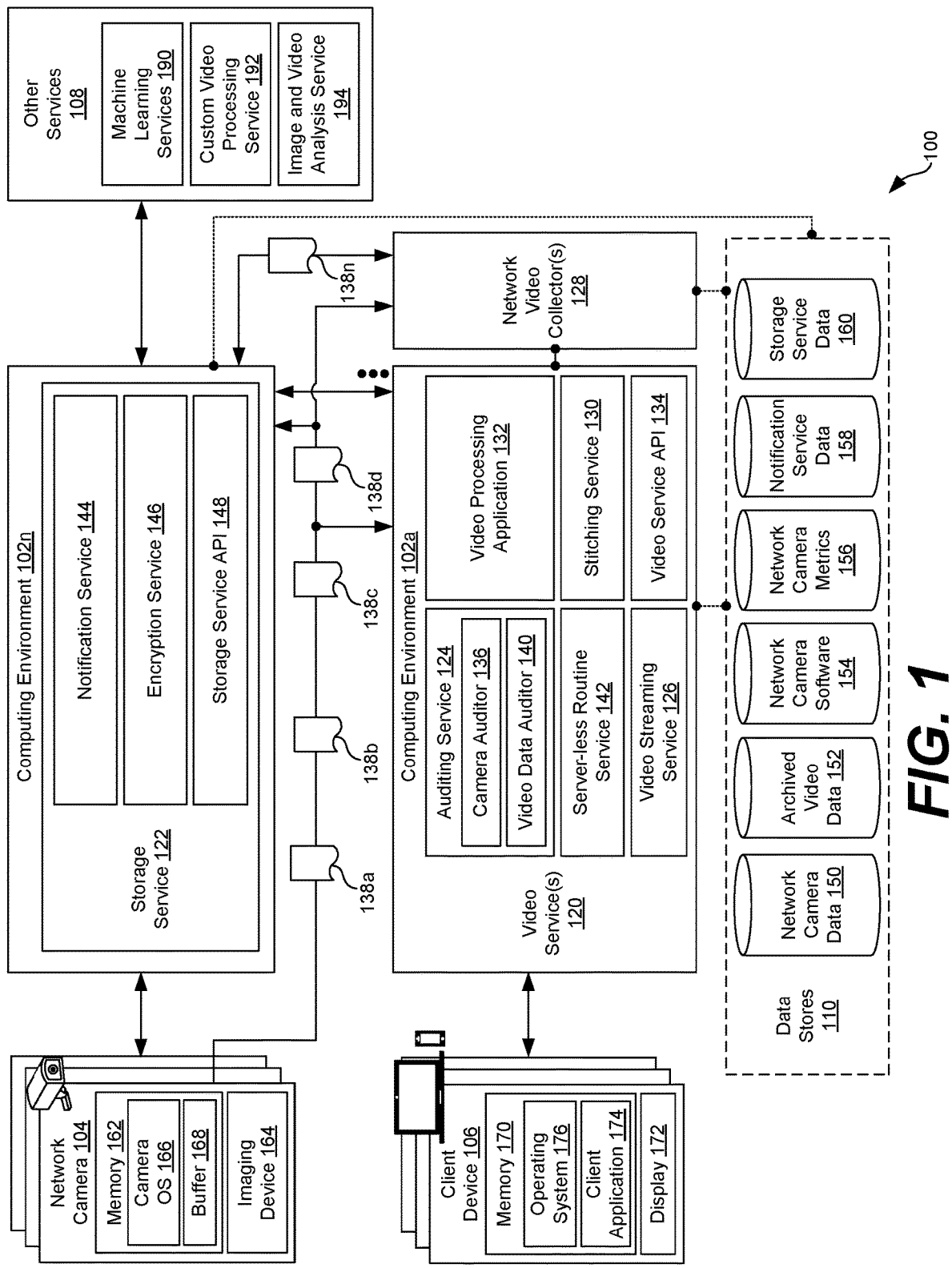
FIG. 1 is a drawing of a video management system in a networked environment according to various embodiments of the present disclosure.

The present disclosure relates to distributed video and network camera management. Some networks that manage network cameras grow at an alarming rate, for instance, due to hundreds or thousands of new cameras being added to a network each month. Due to limitations of existing network video recorder (NVR) systems, embodiments are described herein for a video management system (VMS) that scales more efficiently as network cameras are added to the network, while providing high-quality video in a distributed fashion with minimal points-of-failure.

According to various embodiments, a video management system may include, for instance, one or more computing devices being configured to detect when one or more network cameras have connected to a network. In some embodiments, the network camera may include, for example, processing circuitry, memory, a network interface, and an imaging device configured to generate video data for transmission over the network.

As different types and versions of network cameras have varying capabilities, the computing device(s) may determine the capabilities of the network camera, for instance, when they are "on-boarded" or join the network. The capabilities may include, for example, whether the network camera is able to be configured remotely, an amount of memory or storage of the network camera, a type or a version of an operating system of the network camera, as well as other capabilities discussed herein. As may be appreciated, newer network cameras may include additional or faster processing resources, more memory, faster networking components, as opposed to older network cameras and, thus, may be more suitable for remote configuration.

Depending on the capabilities of the network camera, the computing device(s) may assign the network camera to either a storage service or a network video collector service. To this end, older cameras that are unable to interact with the storage service are still functional; however, the number of NVRs required to support the network cameras may be drastically reduced over time.

The storage service may include a network-based service that stores files and other data using one or more network application programming interfaces (APIs). As may be appreciated, the storage service allows developers access to highly scalable, reliable, fast, and inexpensive data storage infrastructure. For instance, if a network camera is assigned to the storage service, the network camera may be configured to perform push operations that periodically push video data to the storage service. As such, the computing operations traditionally required by a server (or NVR) to pull video data from a network camera are reduced or eliminated.

Alternatively, the network camera may be assigned to an NVR dedicated to pulling data from the network camera, for instance, when the network camera is older or otherwise unable to be configured to interact with the storage service. The video management system can thus handle different types, makes, models, and versions of network cameras having varying capabilities, while lessening the amount of NVRs required to operate the voluminous amount of network devices in the video management system. As fewer NVRs are required, the computing resources required to run the NVRs can be freed up or dedicated to other uses. In some embodiments, server-less video recording and streaming may be provided.

A video stream showing live or archived content may be generated for the network camera to display the video stream on one or more client devices, or for access by other services, such as machine learning (ML) services. Further, the embodiments described herein for a video management system are directed towards improvements in computer networking and computer systems, namely, by describing a video management system that provides the ability to record high-quality video in a distributed fashion with minimal points-of-failure. Moreover, the embodiments described herein lessen or eliminate the amount of network video collector or network video recorder (NVR) servers and other computing resources dedicated to record video from network-based cameras, thus lessening the amount of computing resources (e.g., computing hardware and network bandwidth) required to record video data using a dedicated server.

In the following discussion, a general description of the video management system and its components is provided, followed by a discussion of the operation of the same.

With reference to FIG. 1, shown is a video management system 100 according to various embodiments. The video management system 100 includes one or more computing environments 102a . . . 102n (collectively "computing environments 102"), a network camera 104, a client device 106, and other services 108, which are in data communication with each other via a network. The network includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environments 102 may comprise, for example, server computers or any other system providing computing capability. Alternatively, the computing environments 102 may employ a plurality of computing devices that may be arranged, for example, in one or more server banks or computer banks or other arrangements. Such computing devices may be located in a single installation or may be distributed among many different geographical locations. For example, the computing environments 102 may include a plurality of computing devices that together may comprise a hosted computing resource, a grid computing resource, or any other distributed computing arrangement. In some cases, the computing environments 102 may correspond to an elastic computing resource where the allotted capacity of processing, network, storage, or other computing-related resources may vary over time. A first computing environment 102a and a second computing environment 102n are shown in FIG. 1 as being separate for illustration purposes; however, it is understood that the computing environment 102a and the computing environment 102n may be the same computing environment in some embodiments.

Various applications, services, or other functionality may be executed in the computing environments 102 according to various embodiments. Also, various data is stored in a data store 110 that is accessible to the computing environments 102. The data store 110 may be representative of a plurality of data stores 110 as can be appreciated. The data stored in the data store 110, for example, is associated with the operation of the various applications and/or functional entities described below.

The components executed on the computing environments 102, for example, include a video service 120, a storage service 122, and other services, applications, processes, systems, engines, or functionality not discussed in detail herein. The video service 120 is executed to provide live or archived video content captured by the network cameras 104 to the client devices 106 or other services 108, as well as provide other functionality associated with the video management system 100 as will be discussed.

The video services 120 may include, for example, an auditing service 124, a video streaming service 126, a stitching service 130, a video processing application 132, as well as other applications or services. The video service 120, as well as its components, may be accessible using a video service application programming interface (API) 134. For instance, client devices 106 or other services 108 may request and receive streams by making programmatic calls to the video service API 134.

In various embodiments, the auditing service 124 may include a camera auditor 136 that identifies a status of each of the network cameras 104, for instance, to ensure that the network cameras 104 remain online and continue to transmit video data 138a . . . 138n over the network. The video data 138a . . . 138n can include, for example, individual video files in some embodiments.

Further, the auditing service 124 may include a video data auditor 140 that verifies that video has been successfully collected from the network cameras 104. In some embodiments, the functionality of the auditing service 124 and its components may be performed using a server-less routine service 142. For instance, the server-less routine service 142 can include a utility computing model that allows third-party developers, applications, and services to execute code without having to provision or manage dedicated servers. Only the compute time consumed requires payment, as opposed to paying for a server in which you are being charged when code is not executing. As such, the camera auditor 136 and video data auditor 140 may not require their own server, increasing the computational efficiency of the video management system 100.

The video streaming service 126 may provide live or archived video content to the client devices 106 or other services 108. In some embodiments, the video streaming service 126 may access the video data 138 sent over the network to generate a seamless stream of video content. As such, the video streaming service 126 may access the video data 138 from the storage service 112 or a network video collector 128 (NVC), as will be discussed. It is understood that network video collectors 128 may perform "pull" operations, where video data 138 from the network cameras 104 is actively obtained by the network video collectors 128 (contrasted with "push" operations).

The stitching service 130 may be executed to "stitch" or combine multiple frames of a video with overlapping fields of view to produce a segmented panorama or high-resolution video. For instance, the stitching service 130 may combine video data 138 from a first network camera 104 showing a first angle of a location with video data 138 from a second network camera 104 showing a second, different angle of the location to generate a video stream. The video stream may show the location as a combination of the first angle and the second angle, as may be appreciated.

The video processing application 132 may be executed to perform additional video processing functions, such as converting a file format of one file to another, adjusting video resolution, adding subtitles, or performing another video processing operation as may be appreciated. The video service API 134 may include a network interface for interacting with the network cameras 104, the client devices 106, the storage service 122, as well as other services 108. To the end, the video service API 134 can receive programmatic network calls from various components of the video management system 100 and respond accordingly.

The video management system 100 may further include network video collectors 128 in some embodiments. The network video collectors 128 may be executed to obtain video and other data generated by the network cameras 104. The network video collectors 128 may include dedicated servers in some embodiments or, in some embodiments, the network video collectors 128 may be a part of the one or more computing environments 102a . . . 102n. In some embodiments, the network video collectors 128 may include network video recorders (NVRs). Further, in some embodiments, the network video collectors 128 may be configured to actively collect video and other data from the network cameras 104 by performing pull operations (as opposed to the network cameras 104 performing push operations).

Turning now to the storage service 122, the storage service 122 may include a storage service API 148 that facilitates the remote storage and retrieval of any amount of data in the data store 110, at any time, from anywhere on the network. The storage service 122 provides the video management system 100 with access to a highly scalable, reliable, fast, and inexpensive data storage infrastructure, which may be more efficient and scalable than the network video collectors 128. The storage service 122 may include, for example, a notification service 144, an encryption service 146, the storage service API 148, as well as other services or applications not described herein. The storage service 122 may store data in particular data storage regions, referred to as "buckets," that can be referred to by way of a uniform resource locator (URL). In one embodiment, the storage service 122 may receive data for storage and produce requested data via hypertext transfer protocol (HTTP).

The notification service 144 generates notifications when certain events happen in the video management system 100. For instance, when a network camera 104 uploads video data 138 to the storage service 122, the notification service 144 may notify the video service 120 that video data 138 has been received from the network camera 104. The notification service 144 may further receive messages on a topic for which one or more listeners are registered. Upon receiving the messages, the notification service 144 may distribute messages to registered listeners, which may include various components of the video management system 100. In one embodiment, the notification service 144 may employ a shared queue that can be written to and read by one or more entities. Both the storage service 122 and the notification service 144 may be provided to customers as a service under a utility computing model by the operator of the computing environments 102. In some embodiments, the encryption service 146 may encrypt data that is generated through the video management system 100, such as the video data 138.

The data stored in the data store 110 includes, for example, network camera data 150, archived video data 152, network camera software 154, network camera metrics 156, notification service data 158, storage service data 160, and potentially other data. Network camera data 150 can include various information pertaining to a network camera 104, such as an internet protocol (IP) address, media access control (MAC) address, unique identifier, model name, model number, and version of the network camera 104, as well as other information. Further, the video service 120 may store a status of the network camera 104, such a status describing whether the network camera 104 is operational.

The archived video data 152 may include, for example, the video data 138 received from the network cameras 104 over the network. In some embodiments, the video data 138 is transmitted as one or more video files, such as moving pictures expert group (MPEG) files, audio video interleave (AVI) files, Windows® media video (WMV) files, or files in another suitable file format. The network camera software 154 may include an application, operating system, or firmware that may be programmed into memory 162 of the network cameras 104 depending on the capabilities of a respective one of the network cameras 104. In some embodiments, the network camera software 154, when installed on a network camera 104, directs the network camera 104 to send video data 138 to the storage service 122, as will be described.

Network camera metrics 156 may include, for example, camera-specific metrics for logging to help detect problems, identify causes, and alert appropriate services or personnel to remediate non-operational network cameras 104. The notification service data 158 may include settings, configurations, or logs for sending notifications when particular events occur in the video management system 100, such as when a network camera 104 successfully transmits a video file or other amount of video data 138 over the network.

The storage service data 160 may include data stored by the storage service 122. In some embodiments, to save video data 138 using the storage service 133, a data storage region (also referred to as a "bucket") and a corresponding data object may be created and any number of video files or other objects may be stored in the data storage region. The storage service API 148 may provide an interface for management the data storage regions as well as the objects stored thereon. For example, a data storage region may be created for a particular one of the network cameras 104 and video data 138 generated by the network camera 104 may be uploaded to the data storage region.

The network camera 104 is representative of a plurality of network cameras 104 that may be coupled to the network. The network camera 104 may include, for example, a processor-based system or other processing circuitry having memory 162, an imaging device 164, as well as other components as may be appreciated. In some embodiments, the memory 162 may include a camera operating system 166 as well as one or more applications executable thereon. Additionally, the memory 162 may include a buffer 168 for storing video data 138 generated by the network camera 104 prior to transmission over the network.

Similarly, the client device 106 is representative of a plurality of client devices 106 that may be coupled to the network. The client device 106 may include, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 may include memory 170 and a display 172. The display 172 may include, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 may be configured to execute various applications such as a client application 174 and/or other applications. The client application 174 may be executed in a client device 106, for example, to access network content (e.g., a video stream or video file) served up by the computing environments 102 and/or other servers, thereby rendering a user interface on the display 172. To this end, the client application 174 may comprise, for example, a browser, a dedicated application, etc., and the user interface may comprise a network page, an application screen, etc. The client device 106 may be configured to execute applications beyond the client application 174 such as, for example, email applications, social networking applications, word processors, spreadsheets, and/or other applications. Like the network camera 104, the client device 106 can include an operating system 176 stored in the memory 170 and executable by the client device 106. The other services 108 can include, for example, machine learning services 190, custom video processing services 192, image and video analysis services 194 (e.g., facial recognition or object detection services), as well as other services that may require video data 138, whether live or archived.

Next, a general description of the operation of the various components of the video management system 100 is provided. To begin, it is understood that new ones of the network cameras 104 may be periodically added to the video management system 100. As network video collectors 128 are costly in terms of computing architecture required to pull video data 138 from the network cameras 104, it is desirable to reduce reliance on the network video collectors 128 to the extent possible while still supporting legacy network cameras 104.

To this end, the video service 120 may be configured to detect when a new network camera 104 has connected to a network or otherwise introduced to the video management system 100. In various embodiments, the video service 120 may identify when a device is added to the network based on detection of an internet protocol (IP) address within a range of IP addresses assigned to the network. In additional embodiments, the video service 120 may receive a request from a network camera 104 to join the network of the video management system 100. In either case, the video service 120 may perform an on-boarding process to add the new network camera 104 to the video management system 100 while optimizing use of computing resources.

As opposed to assigning the new network camera 104 to one of the network video collectors 128, it is more ideal to assign the new network camera 104 to the storage service 122. Notably, the storage service 122 can be scaled more quickly and efficiently as network cameras 104 are added as the storage service 122 does not require proprietary software or hardware equipment. However, not every type of network camera 104 has the capability of interacting with the storage service 122. For instance, some network cameras 104 have very little available memory, no ability to customize beyond default behavior, and some network cameras 104 do not permit third-party applications to be installed thereon.

Thus, the video service 120 may determine the capabilities of the network camera 104, for instance, to determine whether the network camera 104 can be configured to communicate video data 138 to the storage service 122. In some embodiments, the video service 120 may query the network camera 104 for information pertaining to the network camera 104. Alternatively, information pertaining to a particular make, model, or version of the network camera 104 may be stored as network camera data 150 in the data store 110, which may be accessed to determine the capabilities of the network camera 104.

The information pertaining to the network camera 104 may include, for example, information pertaining to a hardware component of the network camera 104 or a software component of the network camera 104. The hardware component may include, for example, a processor, hard drive, random access memory (RAM), network interface card, or other hardware component, as well as corresponding specifications. The software component may include, for example, a type or a version of a camera operating system 166 executing on the network camera 104.

The video service 120 may determine whether the network camera 104 is able to be configured to interact with the storage service 122 based at least in part on the determined capabilities of the network camera 104. In some embodiments, the video service 120 may determine whether network camera software 154 can be installed on the network camera 104, such that the network camera software 154 configures the network camera 104 to send video data 138 to the storage service 122. The network camera software 154 can include an application, operating system, or firmware in some examples. As may be appreciated, this may not be able to be accomplished on older ones of the network cameras 104 due to limitations of memory or other components.

If the network camera 104 is unable to be configured to interact with the storage service 122, the video service 120 may assign the network camera 104 to a network video collector 128. This may include, for instance, provisioning or installing a new network video collector 128 in the computing environments 102. Alternatively, an underutilized one of the network video collectors 128 may be identified and assigned to retrieve video data 138 from the network camera 104. It is understood that the network video collector 128 may perform pull operations to retrieve the video data 138 from the network camera 104, as opposed to the network camera 104 performing a push operation.

In the alternative, if the network camera 104 is able to be configured to interact with the storage service 122, the video service 120 may assign the network camera 104 to the storage service 122. To do so, the video service 120 may configure the network camera 104 to push video data 138 directly to the storage service 122 using programmatic calls to the storage service API 148 in accordance with one or more settings. By communicating the video data 138 directly to the storage service 122, the video data 138 is not required to be routed through intermediary services or applications, such as the network video collectors 128 or other services that can be proprietary to a manufacturer of the network camera 104.

In some embodiments, the network camera 104 may be configured to generate and store one minute segments (or segments having any other suitable length of time) of video data 138 in in the buffer 168. The video data 138 in the buffer 168 may be transmitted to the storage service 122 periodically. In response to a successful transmission of the video data 138 over the network, the video data 138 stored in the buffer 168 may be removed to make room for additional video data 138.

In some embodiments, prior to configuring the network camera 104, the video service 120 may configure the storage service 122 to store video data 138 received from the network camera 104. For instance, the video service 120 may create a new data storage region, or "bucket," in the storage service data 160 for a network camera 104 that may be accessed by the network cameras 104 using a URL generated for the data storage region. The video data 138 may be stored in the data storage region by the storage service 122 as a data object (or "object"). Information pertaining to the data storage region, or the objects stored therein, may be obtained using the storage service API 148.

In various embodiments, assigning the network camera 104 to the storage service 122 may require verifying or updating firmware of the network camera 104. Additionally, credentials may be created such that the network camera 104 can interact with the storage service 122. Due to video management systems 100 having a large number of network cameras 104 and due to account limitations of the storage service 122, buckets or credentials may be shared among network cameras 104 in a same geographic location or within close proximity.

Thereafter, the video service 120 may retrieve video data 138 generated by the network camera 104, for instance, from the storage service 122 or a corresponding one of the network video collectors 128. To this end, the storage service 122 may retrieve the video data 138 from the storage service data 160 or, alternatively, the network video collector 128 may retrieve the video data 138 from the archived video data 152. The video data 138 may include one or more video files in some embodiments that may be coalesced into a single video file. The video streaming service 126 may be employed to stream the video data 138 to one or more client devices 106 or to other services 108.

In additional embodiments, the network video collectors 128, like the network cameras 104, may be configured to interact with the storage service 122, as opposed to performing customary local storage of video. For instance, the video service 120 may configured the network video collectors 128 to collect video data 138 from the network cameras 104, such as those that are unable to be configured to directly communicate with the storage service 122. Similar to the configuration of the network cameras 104, to configure the network video collectors 128 to interact with the storage service 122, an application, operating system, firmware, or other software can be installed to configure the network video collectors 128 to store video data 138 with the storage service 122. In these embodiments, the video streaming service 126 only interacts with the storage service 122 as the storage service 122 retains video data 138 from both the network cameras 104 and the network video collectors 128.

Additionally, it is desirable to detect when and where video data 138 is transmitted and stored, identify when network cameras 104 are operational and non-operational, and ensure each of the network cameras 104 is having video data 138 collected. As such, the video service 120 may be configured to identify when network cameras 104 are operational or non-operational. To this end, in some embodiments, the notification service 144 may be configured to notify the video service 120 each time when video data 138 has been received and stored by the storage service 122. For instance, when the notification is received from the notification service 144, the video service 120 may trigger an execution of the video data auditor 140 to determine whether the network camera 104 is operational and/or verify that the video data 138 contains valid video content.

Thus, in some embodiments, the video data auditor 140 may access the video data 138 from the storage service 122 to verify that the video data 138 contains valid video content. This may include, for instance, checking headers of the video data 138 or verifying video or audio data contained in a payload of the video data 138. In some embodiments, the video content may not be checked each time video data 138 is received. For instance, in some embodiments, the video data auditor 140 may determine the validity of the video data 138 at a predetermined frequency (e.g., every five uploads or other frequency).

The video data auditor 140 may update the network camera data 150 to indicate the network camera 104 is operational or non-operational, for instance, based on the verification of the video data 138. In some embodiments, the video data auditor 140 may use a bucket name and a key generated by the storage service 122 when storing video data 138 to identify a corresponding network camera 104. The network camera data 150 for the corresponding network camera 104 may be updated accordingly, for example, to indicate that the network camera 104 is operational.

Although the video data auditor 140 obtains video data 138 and verifies the validity of the video data 138, the video data auditor 140 may be unable to detect cameras from which no files are being uploaded (e.g., non-operational network cameras 104). As such, the video service 120 may also include the camera auditor 136. While execution of the video data auditor 140 may be triggered based on receipt of video data 138 by the storage service 122, the camera auditor 136, alternatively, may be triggered automatically after an elapse of a predetermined period of time.

In some embodiments, the camera auditor 136 may run every minute as triggered by an event scheduled with the notification service 144. On each execution, the camera auditor 136 may detect network cameras 104 for which the video data auditor 140 has not recently recorded receiving video data 138. As such, the camera auditor 136 may query the storage service 122, for instance, to check for new video data 138 that has been received or stored after a last check performed by the camera auditor 136. It is understood that if new video data 138 has not been created, the network camera 104 may be non-operational for a multitude of reasons, such as network connectivity problems or issues arising from the hardware or software components of the network camera 104.

Thus, the camera auditor 136 may determine whether new video data 138 exists. In the event that new video data 138 has been received and stored by the storage service 122, a timer for the camera auditor 136 may be reset and operation of the camera auditor 136 may cease until another lapse of the predefined period of time. Alternatively, if new video data 138 does not exist, the camera auditor 136 may notify a suitable service, for instance, to perform a remedial action. In some embodiments, the remedial action may include notifying personnel responsible for the maintenance and operation of the network camera 104. In additional embodiments, the remedial action may include cycling power of the network camera 104 (e.g., toggling the network camera 104 between on and off). In further embodiments, the remedial action may include attempting to reformat or reinstall network camera software 154 on the network camera 104, or to revert the network camera 104 to its default settings.

The video service 120 may further identify any unused one of a plurality of network video collectors 128 such that they can be removed or phased out from the video management system 100. Also, the video service 120 may terminate an execution of the network video collectors 128 or their corresponding software applications or services.

Figure 2:
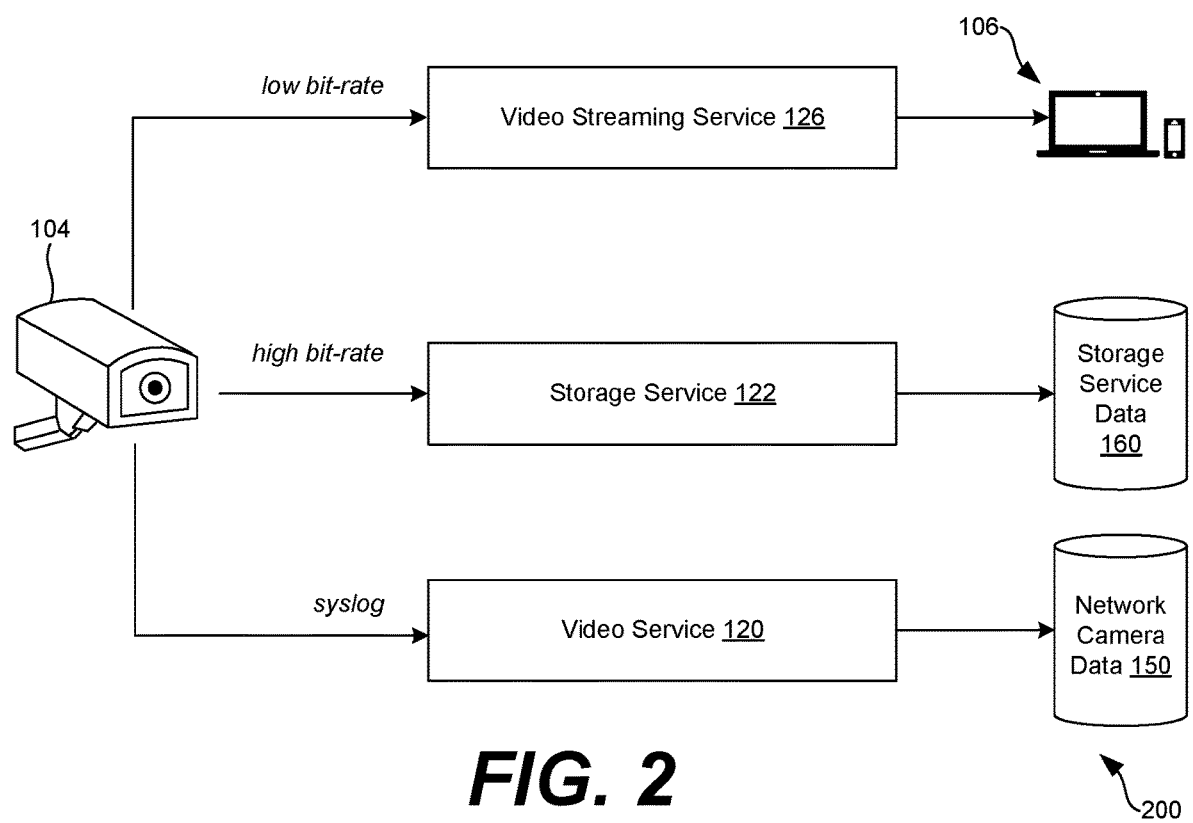
FIG. 2 is a schematic diagram of some components of the video management system of FIG. 1 according to various embodiments of the present disclosure.

Turning now to FIG. 2, a schematic diagram 200 is shown for providing multiple streams of video generated by a network camera 104 according to various embodiments. In some embodiments, the network camera 104 may be configured to transmit simultaneous streams having different bit-rates. For instance, the network camera 104 may be configured to transmit a first video stream having a low bit-rate to the video streaming service 126 (e.g., for viewing a live video stream) while transmitting a second video stream having a high bit-rate to the storage service 122 (e.g., for viewed an archived video stream). By providing the video stream having a low-bit rate to the video streaming service 126, the client devices 106 are able to access a video stream in real-time or near real-time. However, it may be desirable for a video stream having a high bit-rate to be transmitted to the storage service 122, so video data having a high-quality may be stored in buckets in the storage service data 160.

Further, in FIG. 2, the network camera 104 may transmit "syslog" data, or data in a standard for message logging, to the video service 120 such that the syslog data can be stored as network camera data 150. As may be appreciated, the syslog data may be used by the video service 120 when determining whether the network camera 104 is operational, non-operational, or requires corrective action.

Figure 3:
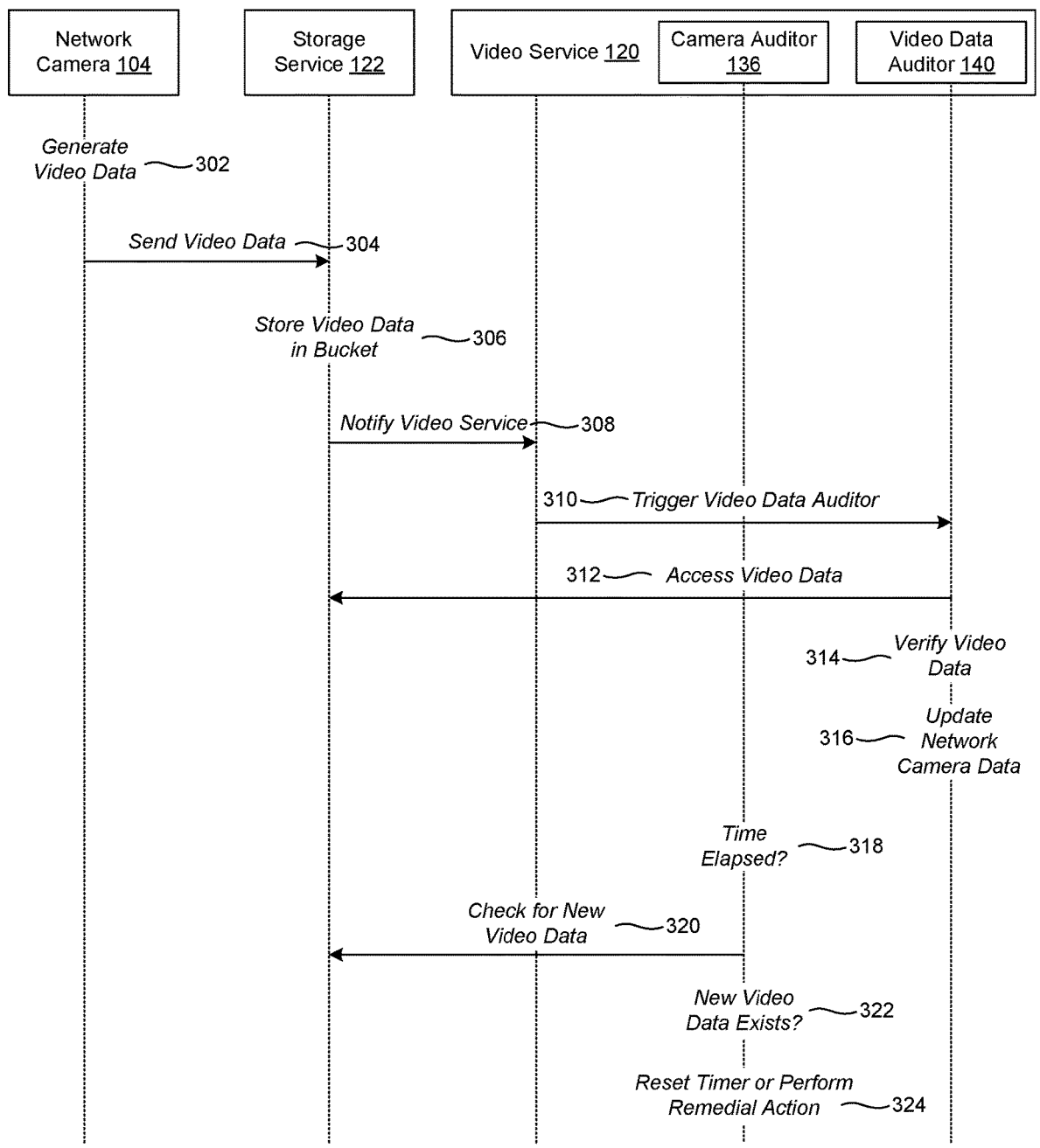
FIG. 3 is a sequence diagram illustrating one example of functionality implemented as portions of the video management system of FIG. 1 according to various embodiments of the present disclosure.

Moving on to FIG. 3, a sequence diagram 300 is shown that provides one example of the operation of a portion of the video management system 100 according to various embodiments. It is understood that the sequence diagram 300 of FIG. 3 provides merely an example of the many different types of functional arrangements that may be employed to implement the operation of the portion of the video management service 100 as described herein. As an alternative, the sequence diagram 300 of FIG. 3 may be viewed as depicting an example of elements of a method implemented in the video management system 100 according to one or more embodiments.

It is understood that, depending on the capabilities of the network camera 104, the video service 120 may configure the network camera 104 to interact with the storage service 122 by pushing video data 138 to the storage service 122. Beginning with 302, the network camera 104 may generate video data 138 locally on the network camera 104. For instance, the network camera 104 may use the imaging device 164 to generate video data 138 that is temporarily stored in the buffer 168 for eventual transmission to the storage service 122 (e.g., after an elapse of a predefined period of time or after a portion of the buffer 168 is filled with video data 138).

Next, in 304, the network camera 104 may send the video data 138 over the network, for instance, to the storage service 122. As the video service 120 may configure the network camera 104 and the storage service 122, for instance, upon the network camera 104 being added to the network, the storage service 122 may include a bucket or other storage location for the video data 138 generated by the network camera 104. For instance, a bucket may be created for the network camera 104 in the storage service 122, where a URL can be used to retrieve or store data in the bucket. In addition to installing network camera software 154 on the network camera 104, the network camera software 154 may be modified to generate storage requests using the URL corresponding to the bucket generated for the network camera 104. Thus, in 306, the storage service 122 may store the video data 138 in a bucket or otherwise in the storage service data 160.

In 308, the storage service 122 (or the notification service 144 of the storage service 122) may notify the video service 120 that new video data 138 has been received and stored by the storage service 122. In response to receipt of the notification from the storage service 122, in 310, the video service 120 may trigger the video data auditor 140, for instance, to indicate that the network camera 104 is operational and/or verify that the video data 138 is valid video content.

In 312, the video data auditor 140 may access the video data 138 from the storage service 122. Thereafter, in 314, the video data auditor 140 may verify that the video data 138 contains valid video content. This may include, for instance, checking headers of the video data 138 or verifying video or audio data contained in a payload of the video data 138. Additionally, the video data auditor 140 may determine a quality of the video files or other video data 138 stored remotely by the network camera 104 using the storage service 122. For instance, the video data auditor 140 may determine whether a resolution of a bit-rate of video data 138 has lessened over time, indicating that the network camera 104 may be partially non-operational.

As validating video content may be computationally intensive, it is understood that this operation may not be performed each time the video data auditor 140 is notified of the creation of the new video data 138. For instance, the validity of video data 138 may be performed at a predetermined frequency in some embodiments.

In 316, the video data auditor may update a data store 110, such as the network camera data 150, to indicate the network camera 104 is operational or non-operational, for instance, based on the verification of the video data 138 performed in 314. In some embodiments, the video data auditor 140 may use a bucket name and a key generated by the storage service 122 when storing video data 138 to identify a corresponding network camera 104. The network camera data 150 for the corresponding network camera 104 may be updated accordingly, for example, to indicate that the network camera 104 is operational.

Although the video data auditor 140 obtains video data 138 and verifies the validity of the video data 138, the video data auditor 140 may be unable to detect cameras from which no files are being uploaded (e.g., non-operational network cameras 104). As such, the video service 120 may also include the camera auditor 136. While execution of the video data auditor 140 may be triggered based on receipt of video data 138 by the storage service 122, the camera auditor 136, alternatively, may be triggered automatically after an elapse of a predetermined period of time. Thus, the operation of the camera auditor 136 may be independent of the preceding operations shown in FIG. 3.

In some embodiments, the camera auditor 136 may run every minute as triggered by an event scheduled with the notification service 144. Thus, in 318, the camera auditor 136 may determine whether a predetermined amount of time has elapsed. On each execution, the camera auditor 136 may detect network cameras 104 for which the video data auditor 140 has not recently recorded receiving video data 138. As such, in 320, the camera auditor 136 may query the storage service 122, for instance, to check for new video data 138 that has been received or stored after a last check performed by the camera auditor 136. It is understood that if new video data 138 has not been created, the network camera 104 may be non-operational for a multitude of reasons, such as network connectivity problems or issues arising from the hardware or software components of the network camera 104.

Thus, in 322, the camera auditor 136 may determine whether new video data 138 exists based on the result of the check performed in 320. In 324, assuming new video data 138 has been received and stored by the storage service 122, the timer may be reset and operation of the camera auditor 136 may cease until another lapse of the predefined period of time. Alternatively, in 324, if new video data 138 does not exist, the camera auditor 136 may notify a suitable service, for instance, to perform a remedial action. In some embodiments, the remedial action may include notifying personnel responsible for the maintenance and operation of the network camera 104. In additional embodiments, the remedial action may include cycling power of the network camera 104 (e.g., toggling the network camera 104 between on and off). In further embodiments, the remedial action may include attempting to reformat or reinstall network camera software 154 on the network camera 104. In some embodiments, the operation of the video data auditor 140 and the camera auditor 136 are performed using the server-less routine service 142.

Figure 4:
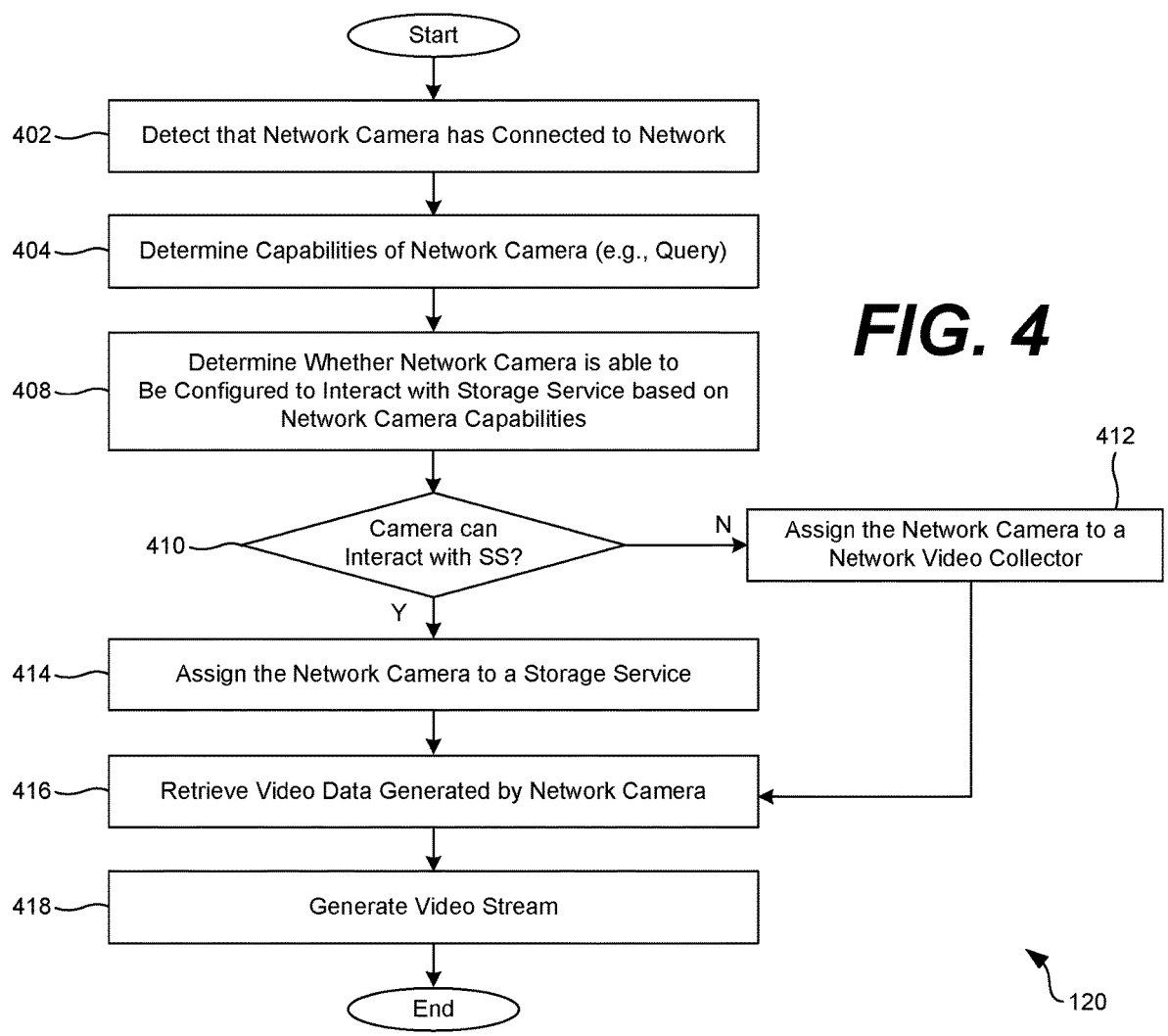
FIGS. 4-6 are flowcharts illustrating examples of functionality implemented as portions of the video service(s) executed in a computing environment in the video management system of FIG. 1 according to various embodiments of the present disclosure.

Referring next to FIG. 4, shown is a flowchart that provides one example of the operation of a portion of the video service 120 according to various embodiments. It is understood that the flowchart of FIG. 4 provides merely an example of the many different types of functional arrangements that may be employed to implement the operation of the portion of the video service 120 as described herein. As an alternative, the flowchart of FIG. 4 may be viewed as depicting an example of elements of a method implemented in the computing environment 102a according to one or more embodiments.

Beginning with 402, the video service 120 may detect that a network camera 104 has connected to the network, where the network camera 104 is new to the video management system 100 as may be appreciated. In some embodiments, the video service 120 may identify when a device is added to the network based on detection of an IP address within a range of IP addresses assigned to the network. In additional embodiments, the video service 120 may receive a request from a network camera 104 to on-board to or join the network of the video management system 100.

In additional embodiments, the video service 120 may invoke an address resolution protocol (ARP) command using a known MAC address (or a portion of a known MAC address) to identify an IP address for a network camera 104. For instance, while MAC addresses may be unique to a particular devices, a particular manufacturer or vendor of network cameras 104 may employ a common substring of a MAC address. The video service 120 may identify potential network cameras 104 or other devices on a network using the substring of the MAC address for a given manufacturer or vendor.

Next, in 404, the video service 120 may determine the capabilities of the network camera 104, for instance, to determine whether the network camera 104 can be configured to communicate video data 138 to the storage service 122. To this end, in some embodiments, the video service 120 may query the network camera 104 for information pertaining to the network camera 104. Alternatively, information pertaining to a particular make, model, or version of the network camera 104 may be stored as network camera data 150 in the data store 110, which may be accessed to determine the capabilities of the network camera 104.

The information pertaining to the network camera 104 may include, for example, information pertaining to a hardware component of the network camera 104 or a software component of the network camera 104. The hardware component may include, for example, a processor, hard drive, RAM, network interface card, or other hardware component, as well as corresponding specifications. The software component may include, for example, a type or a version of a camera operating system 166 executing on the network camera 104.

In some embodiments, the video service 120 may include a camera administrator service or routine configured to connect to the network camera 104 as a root user having root privileges. By having root privileges, the video service 120, may collect data such as the model of the network camera 104, the firmware version of the network camera 104, as well as other pertinent configuration details.

In 408 and 410, the video service 120 may determine whether the network camera 104 is able to be configured to interact with the storage service 122 based at least in part on the capabilities of the network camera 104 determined in 404. In some embodiments, the video service 120 may determine whether network camera software 154 can be installed on the network camera 104, such that the network camera software 154 configures the network camera 104 to send video data 138 to the storage service 122. The network camera software 154 can include an application, operating system, or firmware in some examples. As may be appreciated, this cannot be accomplished on older ones of the network cameras 104 due to limitations of memory or other components of the network cameras 104.

If the network camera 104 is unable to be configured to interact with the storage service 122, the process may proceed to 412. In 412, the video service 120 may assign the network camera 104 to a network video collector 128. This may include, for instance, provisioning or installing a new network video collector 128 in the computing environments 102. Alternatively, an underutilized one of the network video collectors 128 may be identified and assigned to retrieve video data 138 from the network camera 104. It is understood that the network video collector 128 may perform pull operations to retrieve the video data 138 from the network camera 104, as opposed to the network camera 104 performing a push operation. Thereafter, the process may skip ahead to 416.

Referring back to 410, if the network camera 104 is able to be configured to interact with the storage service 122, the process may proceed to 414. In 414, the video service 120 may assign the network camera 104 to the storage service 122 which may include, for example, configuring the network camera 104 to communicate video data 138 to the storage service 122 in accordance with one or more settings. In one example, the network camera 104 may be configured to generate and store one minute segments (or segments having any other suitable length of time) of video data 138 in in the buffer 168. The video data 138 in the buffer 168 may be transmitted to the storage service 122 periodically. In response to a successful transmission of the video data 138 over the network, the video data 138 stored in the buffer 168 may be removed to make room for additional video data 138.

Further, assigning the network camera 104 to the storage service 122 may include configuring the storage service 122 for the network camera 104. For instance, the video service 120 may create a new data storage region (or "bucket") in the storage service data 160 for a network camera 104 (or group of network cameras 104) that can be accessed by the network cameras 104 using a URL generated for the data storage region. The video data 138 may be stored in the data storage region by the storage service 122 as an object. Information pertaining to the data storage region, or the objects stored therein, may be obtained using the storage service API 148. Additionally, the objects themselves (e.g., video files or portions thereof) may be obtained and placed in a sequential order to stream archived video content to one or more client devices 106 or other service 108.

In additional embodiments, assigning the network camera 104 to the storage service 122 may require verifying or updating firmware of the network camera 104. Additionally, identity and access management (IAM) and other credentials may be created such that the network camera 104 can interact with the storage service 122. Due to video management systems 100 having a large number of network cameras 104 and due to account limitations of the storage service 122, buckets and/or credentials may be shared among network cameras 104 in a same geographic location or within close proximity.

In 416, the video service 120 may retrieve the video data 138 generated by the network camera 104, for instance, from the storage service 122 or a corresponding one of the network video collectors 128. To this end, the storage service 122 may retrieve the video data 138 from the storage service data 160 or, alternatively, the network video collector 128 may retrieve the video data 138 from the archived video data 152. The video data 138 may include one or more video files in some embodiments. In 418, the video service 120 may generate a video stream using the video data 138 retrieved in 416. The video stream may be transmitted or otherwise made accessible to one or more client devices 106, or by other services 108, as may be appreciated. Thereafter, the process may proceed to completion.

Figure 5:
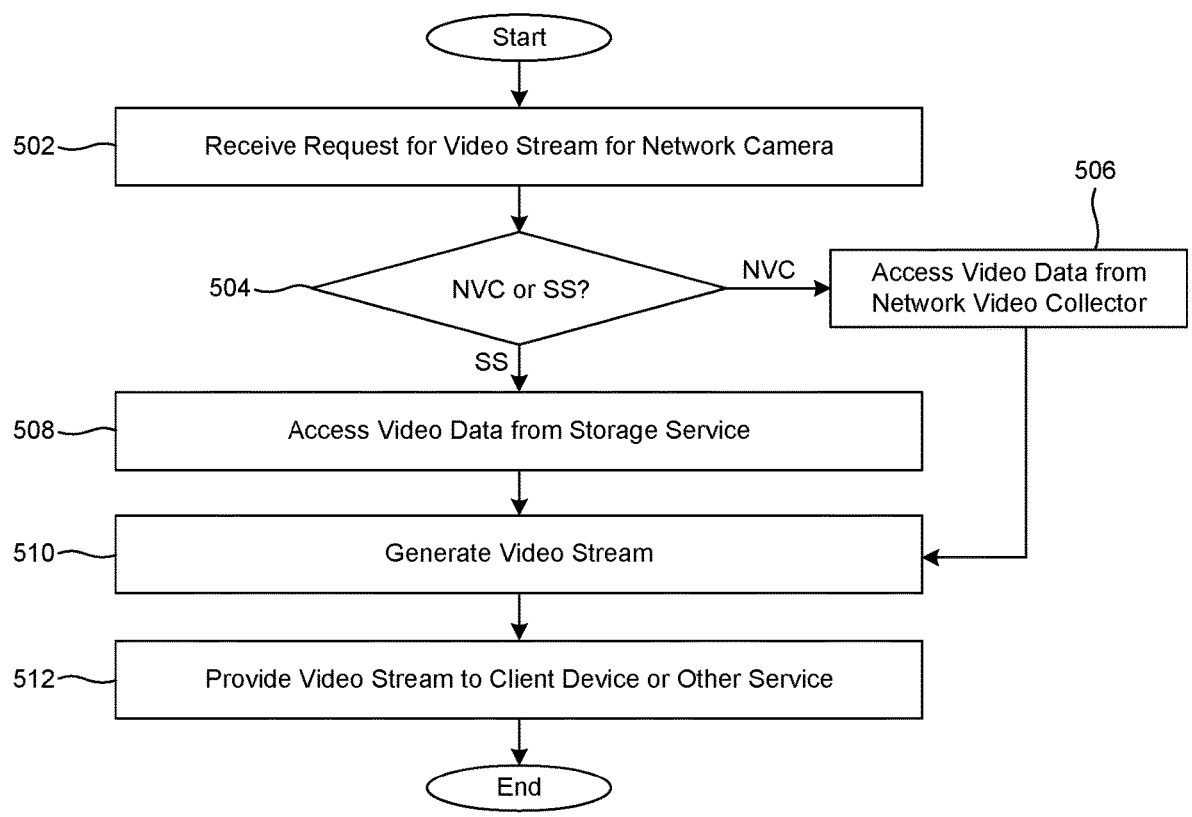

Referring next to FIG. 5, shown is a flowchart that provides one example of the operation of a portion of the video service 120 according to various embodiments. It is understood that the flowchart of FIG. 5 provides merely an example of the many different types of functional arrangements that may be employed to implement the operation of the portion of the video service 120 as described herein. As an alternative, the flowchart of FIG. 5 may be viewed as depicting an example of elements of a method implemented in the computing environment 102*a* according to one or more embodiments.

Beginning with 502, the video service 120 may receive a request for a video stream, a video file, or other video data 138. For instance, an end user may manipulate a client device 106 to access a live or archived video stream for one or more of the network cameras 104. Alternatively, the other services 118 may request a live or archived video stream to perform machine learning operations.

Next, in 504, the video service 120 may determine whether the network camera 104 corresponding to the request has been assigned to the storage service 122 or a network video collector 128. Such information may be beneficial for determining where to access video data 138 for the network camera 104.

If the network camera 104 has been assigned to a network video collector 128, the process may proceed to 506. In 506, the video service 120 may access video data 138 generated by the network camera 104 from the network video collector 128. For instance, the video service 120 may generate a request that is transmitted to a corresponding network video collector 128 to obtain video data 138 or archived video data 152. The network video collector 128 may access the video data 138 to respond to the request from the archived video data 138 or other one of the data stores 110. Thereafter, the process may proceed to 510.

Referring back to 504, alternatively, if the network camera 104 has been assigned to the storage service 122, the process may proceed to 508. In 508, the video service 120 may access video data 138 from the storage service 122 (as opposed to the network video collector 128). Thereafter, the process may proceed to 510. In some embodiments, 504 may not be required. For instance, in embodiments in which the network video collectors 128 are configured to interact with the storage service 122, the storage service 122 can be used to access video data 138 regardless of whether a network camera 104 was assigned to the storage service 122 or to a network video collector 128.

In 510, the video service 120 may use the video data 138 accessed in 506 or 508 to generate a video stream using the video data 138 retrieved in 416. In 512, the video stream may be provided or otherwise made accessible to one or more client devices 106, or by other services 108, as may be appreciated. Thereafter, the process may proceed to completion.

Figure 6:
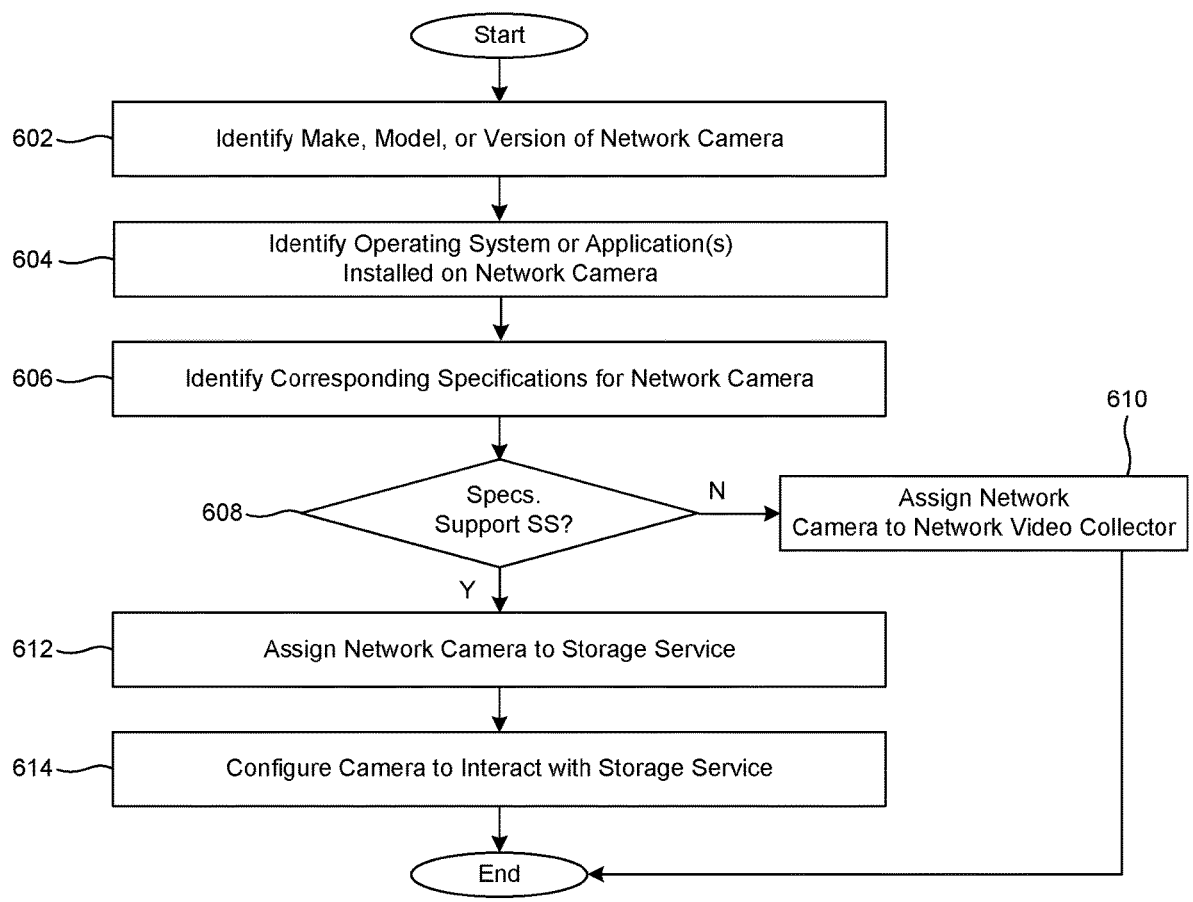

Referring next to FIG. 6, shown is a flowchart that provides one example of the operation of a portion of the video service 120 when identifying a capability of a network camera 104 according to various embodiments. It is understood that the flowchart of FIG. 6 provides merely an example of the many different types of functional arrangements that may be employed to implement the operation of the portion of the video service 120 as described herein. As an alternative, the flowchart of FIG. 6 may be viewed as depicting an example of elements of a method implemented in the computing environment 102*a* according to one or more embodiments.

Beginning with 602, the video service 120 may identify a make, model, or version of a network camera 104. For instance, assume a network camera 104 includes the "Pro-Cam 10 by AlphaCo." The model name may include "Pro-Cam," the version number may include "10," and the make may include "AlphaCo." The information identified in 602 can be used in identifying additional information about the network camera 104, as well as its capabilities.

Next, in 604, the video service 120 may identify an operating system or one or more applications installed on the network camera 104. For instance, the operating system or the one or more applications installed on the network camera 104 may be useful in determining whether the network camera 104 can be configured to interact with the storage service 122.

In 606, the video service 120 may identify corresponding specifications for the network camera 104. The specifications may include, for example, hardware or software components of the network camera 104. Hardware component specifications may include, for example, specifications of a processor, hard drive, RAM, network interface card, imaging device, or other hardware component of the network camera 104. Software components may include, for example, a type or a version of a camera operating system 166 executing on the network camera 104, if not previously determined in 604. The specifications may be determined, for instance, by querying the network camera 104. Alternatively, information pertaining to various types and models of network cameras 104 may be accessed from the data store 110.

Next, in 608, the video service 120 may determine whether the specifications identified in 606 indicate whether the network camera 104 is able to interact with the storage service 122, or can be modified to interact with the storage service 122. In some embodiments, the video service 120 may identify whether the network camera 104 supports third-party or custom software. In additional embodiments, the video service 120 may determine whether the size of memory is sufficient for buffering video data 138 prior to transmission over the network. It is understood that additional checks pertaining to the specifications of the network camera 104 may be performed.

If the video service 120 determines that the specifications of the network camera 104 do not support interaction with the storage service 122, the process may proceed to 610. In 610, the network camera 104 can be assigned to a network video collector 128, as discussed above with respect to FIG. 4. This may include, for instance, provisioning or installing a new network video collector 128 in the computing environments 102. Alternatively, an underutilized one of the network video collectors 128 may be identified and assigned to retrieve video data 138 from the network camera 104. Thereafter, the process can proceed to completion.

Referring back to 608, alternatively, if the video service 120 determines that the specifications of the network camera 104 support interaction with the storage service 122, the process may proceed to 612. In 612, the video service 120 may assign the network camera 104 to the storage service 122.

In 614, the video service 120 may configure the network camera 104 to interact with the storage service 122. For instance, network camera software 154 may include an application or other code that may be installed on a network camera 104 that directs the network camera 104 to perform buffering operations and transmission operations in accordance with the storage service API 148. For instance, a bucket may be created for the network camera 104 in the storage service 122, where a URL can be used to retrieve or store data in the bucket. In addition to installing network camera software 154 on the network camera 104, the network camera software 154 may be modified to generate storage requests using the URL corresponding to the bucket generated for the network camera 104.

In some embodiments, the network camera 104 is configured to transmit the video data 138 as files having a file name matching a predetermined format or a predetermined file naming convention. For instance, in some embodiments, the file name may include a prefix, a suffix, or other string in the file name that uniquely identifies the network camera 104. In additional embodiments, the file name may include a timestamp describing a time at which the video file 138 was created by a network camera 104 or received by the storage service 122. Additionally, in some embodiments, the video data 138 may include a file header that includes a unique identifier for the network camera 104, as well as a start time and an end time during which the video date 138 was recorded by the network camera 104.

In various embodiments, the network camera 104 may be configured such that the highest-quality video data 138 is communicated to the storage service 122. For instance, the network camera 104 may be configured to capture video data 138 at a maximum resolution supported by the imaging device 164 and at a maximum bit-rate.

In additional embodiments, the network camera software 154 may be assigned particular values for storage and transmission of video data 138, for instance, based on the specifications of the network camera 104 identified in 606. For instance, the network camera software 154 may be configured to generate and store variable-length segments of video data 138 in in a buffer 168, depending on the available memory of the network camera 104. The video data 138 in the buffer 168 may be pushed or otherwise transmitted to the storage service 122 periodically in some embodiments, or when the buffer 168 of the network camera 104 is full or nearly full. In response to a successful transmission of the video data 138 over the network, the video data 138 stored in the buffer 168 may be removed to make room for additional video data 138. Thereafter, the process may proceed to completion.

Figure 7:
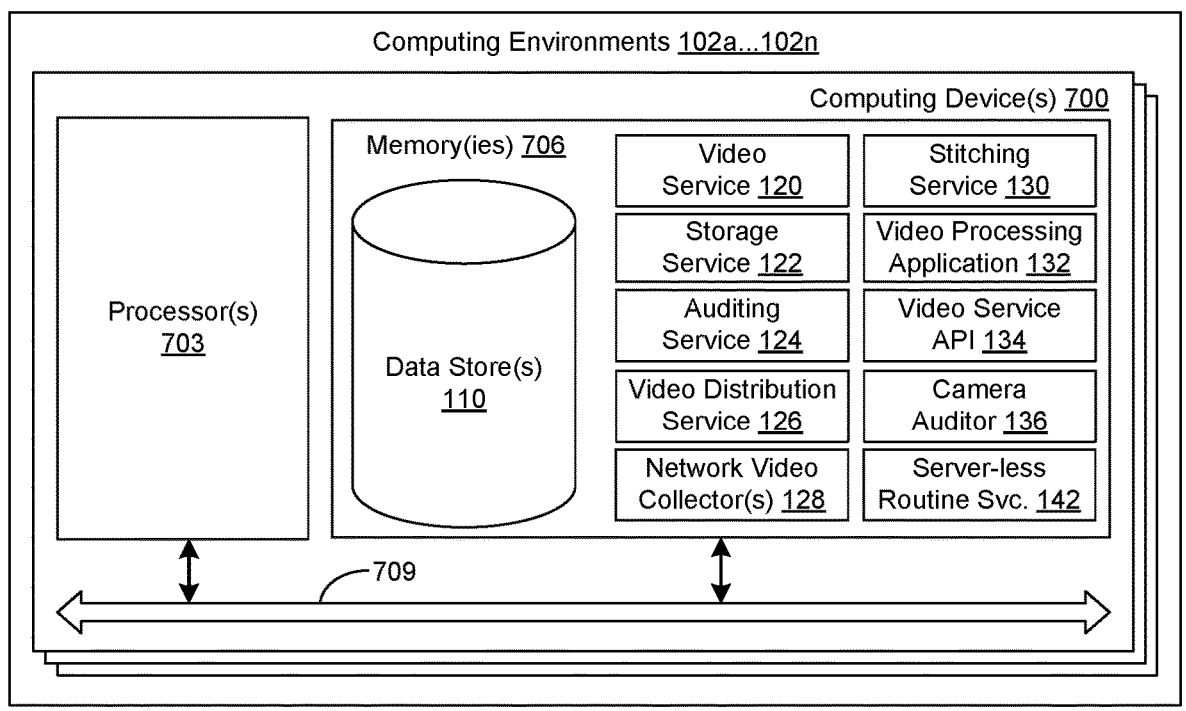
FIG. 7 is a schematic block diagram that provides one example illustration of computing environments employed in the video management system of FIG. 1 according to various embodiments of the present disclosure.

With reference to FIG. 7, shown is a schematic block diagram of the computing environment 102 according to an embodiment of the present disclosure. The computing environment 102 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the video service 120, the storage service 122, the auditing service 124, the video streaming service 126, the network video collectors 128, the stitching service 130, the video processing application 132, the video service API 134, and potentially other services and applications. Also stored in the memory 706 may be a data store 110 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory, read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory, read-only memory, hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the video service 120, the storage service 122, the auditing service 124, the video streaming service 126, the network video collectors 128, the stitching service 130, the video processing application 132, the video service API 134, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4-6 show the functionality and operation of an implementation of portions of the video service 120. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 4-6 show a specific order of execution, it is understood that the order of execution may differ from that which is depicted. For example, the order of execution of two or more blocks may be scrambled relative to the order shown. Also, two or more blocks shown in succession in FIGS. 4-6 may be executed concurrently or with partial concurrence. Further, in some embodiments, one or more of the blocks shown in FIGS. 4-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the video service 120, the storage service 122, the auditing service 124, the video streaming service 126, the network video collectors 128, the stitching service 130, the video processing application 132, and the video service API 134, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the video service 120, the storage service 122, the auditing service 124, the video streaming service 126, the network video collectors 128, the stitching service 130, the video processing application 132, and the video service API 134s, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices in the same computing environment 102. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying program instructions executable in at least one computing device that, when executed, direct the at least one computing device to:
provide a video management system that has a plurality of network cameras connected to a network, individual ones of the plurality of network cameras comprising memory and an imaging device configured to generate video data for transmission over the network through a network interface;
assign, based at least in part on at least one capability of a first subset of the plurality of network cameras, the first subset of the plurality of network cameras to a storage service and configure the first subset of the plurality of network cameras to perform push operations that periodically push video data to the storage service;

assign, based at least in part on the at least one capability of a second subset of the plurality of network cameras, the second subset of the plurality of network cameras to a network video collector, the network video collector being configured to periodically pull video data from the second subset of the plurality of network cameras;

generate a video stream for at least one of the plurality of network cameras for display on at least one client device, wherein the video stream is generated based at least in part on the video data retrieved from the storage service or the network video collector.

2. The non-transitory computer-readable medium of claim 1, wherein individual ones of the plurality of network cameras in the first subset are configured to:

store video data captured by a corresponding one of the plurality of network cameras in the first subset for a predetermined amount of time in a buffer; and send the video data over the network to the storage service as at least one video file.

3. The non-transitory computer-readable medium of claim 2, wherein the at least one video file comprises a file name matching a predetermined format, the file name having a prefix that uniquely identifies the corresponding one of the plurality of network cameras in the first subset.

4. The non-transitory computer-readable medium of claim 1, wherein the at least one capability of the first subset of the network cameras or the second subset of the network cameras comprises at least one of: memory size, buffer size, processing power, operating system version, a presence of a predetermined client application, or an ability to be remotely configured.

5. A system, comprising:

at least one computing device comprising memory; and program instructions stored in the memory and executable in the at least one computing device that, when executed, direct the at least one computing device to:

assign a first network camera to a storage service for remote storage of video data generated by the first network camera, wherein the first network camera is assigned to the storage service based at least in part on at least one capability of the first network camera;

in response to the first network camera being assigned to the storage service, configure the first network camera to periodically push the video data generated by the first network camera directly to the storage service;

assign a second network camera to one of a plurality of network video collectors based at least in part on at least one capability of the second network camera, wherein the one of the plurality of network video collectors is configured to pull video data from the second network camera;

generate a video stream for access by at least one client device or other service, wherein the video stream is generated based at least in part on the video data retrieved from the storage service or the one of the plurality of network video collectors; and identify an unused one of a plurality of network video collectors and terminate an execution of the unused one of the plurality of network video collectors.

6. The system of claim 5, wherein the at least one computing device is further directed to periodically determine a status of the first network camera by identifying a presence of at least one video file stored remotely by the first network camera using the storage service, or a lack thereof.

7. The system of claim 5, wherein the at least one computing device is further directed to periodically determine a quality of at least one video file stored remotely by the first network camera using the storage service.

8. The system of claim 5, wherein the at least one capability of the first network camera or the at least one capability of the second network camera comprises at least one of: memory size, buffer size, processing power, operating system version, a presence of a predetermined client application, or an ability to be remotely configured.

9. The system of claim 5, wherein:

the video data generated by the first network camera shows a first angle of a location;

video data generated by the second network camera shows a second angle of the location; and the video stream comprises the location shown as a combination of the first angle and the second angle, the video stream being generated by stitching together the video data generated by the first network camera and the video data generated by the second network camera.

10. The system of claim 5, wherein the at least one computing device is further directed to:

enroll a camera auditor service with a notification service, the notification service being configured to send a notification to the camera auditor service in response to a video file being created by the first network camera;

in response to a receipt of the notification by the camera auditor service, direct a server-less routine service to:

identify the first network camera from among a plurality of potential network cameras using a name of a logical unit of storage in which the video file is stored and a key corresponding to the video file;

verify that the video file contains valid video content; and update a data store for the first network camera.

11. The system of claim 5, wherein, in response to the first network camera being assigned to the storage service, the first network camera is configured to:

store video data captured by the first network camera for a predetermined amount of time in a memory buffer of the first network camera; and send the video data over a network to the storage service as at least one video file.

12. The system of claim 11, wherein the at least one video file comprises a file name matching a predetermined format, the file name having a prefix that uniquely identifies the first network camera and a timestamp.

13. The system of claim 5, wherein the at least one computing device is further directed to:

prior to assigning the first network camera to the storage service, determine that first network camera is able to be configured remotely through a first query to the first network camera that identifies information pertaining to the first network camera; and identify the at least one capability of the first network camera from the information identified in the first query.

14. The system of claim 13, wherein the at least one computing device is further directed to:

prior to assigning the second network camera to the one of the plurality of network video collectors, determine that second network camera is not able to be configured remotely through a second query to the second network camera that identifies information pertaining to the first network camera; and identify the at least one capability of the second network camera from the information identified in the second query.

15. A computer-implemented method, comprising:
- identifying, by at least one computing device, that a network camera is able to be configured remotely by the at least one computing device;
- in response to the network camera being able to be configured remotely, configuring, by the at least one computing device, the network camera to push video data generated by the network camera to a storage service for remote storage of the video data; and
- generating, by the at least one computing device, a video stream for the network camera for access by a client device or other service, wherein the video stream is generated based at least in part on the video data retrieved from the storage service; and
- enrolling, by the at least one computing device, a camera auditor service with a notification service, the notification service being configured to send a notification to the camera auditor service in response to a video file being created by the network camera;
- in response to a receipt of the notification by the camera auditor service, directing, by the at least one computing device, a server-less routine service to:
  - identify the network camera from among a plurality of potential network cameras using a name of a logical unit of storage in which the video file is stored and a key corresponding to the video file;
  - verify that the video file contains valid video content; and
  - update a data store for the network camera.

16. The computer-implemented method of claim 15, wherein:
- the network camera is a first network camera; and
- the computer-implemented method further comprises assigning, by the at least one computing device, a second network camera to a network video collector, wherein the second network camera is assigned based at least in part on at least one capability of the second network camera.

17. The computer-implemented method of claim 15, further comprising periodically determining, by the at least one computing device, a status of the network camera by identifying a presence of the video file stored remotely by the network camera using the storage service, or a lack thereof.

18. The computer-implemented method of claim 15, further comprising periodically determining, by the at least one computing device, a quality of the video file stored remotely by the network camera using the storage service.

19. The computer-implemented method of claim 15, wherein identifying that the network camera is able to be configured remotely by the at least one computing device further comprises querying, by the at least one computing device, the network camera to identify information pertaining to the network camera.

20. The computer-implemented method of claim 19, wherein the information pertaining to the network camera comprises at least one of: an operating system of the network camera, at least one hardware component of the network camera, and at least one software component of the network camera.

* * * * *